United States Patent
Tsukihashi et al.

(10) Patent No.: US 7,149,164 B2
(45) Date of Patent: Dec. 12, 2006

(54) OPTICAL DISC APPARATUS FOR PROCESSING DATA ACCORDING TO DIFFERENT OPTICAL DISC STANDARDS TO ACHIEVE HIGHER RECORDING DENSITY

(75) Inventors: Akira Tsukihashi, Gunma (JP); Katsuki Hattori, Kiryu (JP)

(73) Assignee: Sanyo Electric Co., Ltd., Osaka (JP)

( * ) Notice: Subject to any disclaimer, the term of this patent is extended or adjusted under 35 U.S.C. 154(b) by 414 days.

(21) Appl. No.: 10/376,970

(22) Filed: Feb. 27, 2003

(65) Prior Publication Data
US 2003/0174606 A1 Sep. 18, 2003

(30) Foreign Application Priority Data
Mar. 18, 2002 (JP) ............... 2002-074189
Mar. 18, 2002 (JP) ............... 2002-074190
Aug. 30, 2002 (JP) ............... 2002-253984

(51) Int. Cl.
*G11B 7/00* (2006.01)
(52) U.S. Cl. ............... 369/47.24; 369/47.53
(58) Field of Classification Search ............ 369/47.24, 369/59.25
See application file for complete search history.

(56) References Cited

U.S. PATENT DOCUMENTS 5,734,787 A * 3/1998 Yonemitsu et al. ......... 386/111
6,594,214 B1 * 7/2003 Misaizu ..................... 369/53.11
6,865,340 B1 * 3/2005 Heo et al. .................... 386/125
6,901,210 B1 * 5/2005 Heo et al. .................... 386/125
2002/0067671 A1 * 6/2002 Park ........................... 369/53.2
2003/0133385 A1 * 7/2003 Lee et al. ................... 369/59.24

FOREIGN PATENT DOCUMENTS

| CN | 1170929 | 1/1998 |
| JP | 2001-126404 | 5/2001 |
| JP | 2002-025064 | 1/2002 |
| JP | 2002-056617 | 2/2002 |

* cited by examiner

Primary Examiner—Andrea Wellington
Assistant Examiner—Lixi Chow
(74) Attorney, Agent, or Firm—Hogan & Hartson LLP

(57) ABSTRACT

An optical disc apparatus which realizes high density disc recording using an existing disc and an existing recording signal processor. When recording data on a recordable disc corresponding to an existing first standard, either one of first and second recording signal processors 9 and 10 can be selectively used, so that data recording in the high density recording mode which allows data generated by the second recording signal processor 10 to be recorded on a recordable disc corresponding to the first standard can be performed. As a result, the existing second standard data format can be used with regard to a disc corresponding to the existing first standard, so that recording can be performed at a higher density than when the first standard data format is used for the same disc, thereby increasing recording capacity.

10 Claims, 5 Drawing Sheets

OPTICAL DISC APPARATUS FOR PROCESSING DATA ACCORDING TO DIFFERENT OPTICAL DISC STANDARDS TO ACHIEVE HIGHER RECORDING DENSITY

BACKGROUND OF THE INVENTION

1. Field of the Invention

The present invention relates to an apparatus and a method for recording data onto an optical disc.

2. Description of Related Art

Known optical disc standards for optically recording and reproducing data using an optical head include the CD (Compact Disc) and DVD (Digital Versatile Disc) standards. DVDs have the same disc diameter as CDs to secure mechanical compatibility therebetween and also provide a higher recording density than CDs to satisfy a need for higher capacity.

DVD drives for reproducing such DVDs maintain capability with CDs and are therefore capable of reproducing CDs as well.

Recordable optical discs can be realized in both CDs and DVDs. While there are presently only two common standards for recordable CD discs, the CD-R (Recordable) or CD-RW (Rewritable) standards, various recordable disc systems now coexist such that a de facto DVD standard has not been established.

Further, despite the disadvantage that the recording method of the CD standard allows only a much smaller of data to be stored on a disc than the DVD standard recording method, the existence of the recordable CD standards described above has led to the mass marketing of inexpensive LSIs for CD-R and CD-RW recording signal processors. In addition, CD-R discs and CD-RW discs are also much less expensive than recordable DVD discs.

On the other hand, because the standard storage capacities of CD-R and CD-RW are 650 MB or 700 MB, there is a demand for a higher storage capacity so as to meet the current situation in which a file data amount processed by a personal computer is being increased.

Therefore, there has been proposed a method in which the length of recording marks composed of pits and lands to be recorded on a disc is reduced while the CD data format, namely a modulation code and an error correction code (ECC) for CDs are used, thereby increasing the data recording density compared to the line density specified by the CD standard and increasing storage capacity of the disc. (See Japanese Patent Laid-Open Publication No. 2002-25064)

According to the method disclosed in Japanese Patent Laid-Open Publication No. 2002-25064, there are advantages that an inexpensive mass-marketed recording signal processor LSI can be used, the system design can be simplified, and existing discs can be used.

According to this method, however, because the format efficiency is fixed according to a data format, it is not possible to perform high density disc recording by increasing the format efficiency. Consequently, when a laser beam (beam of focused laser light) having a wavelength which conforms to the CD standard is used for disc recording and reproduction, the length of recording marks cannot be reduced significantly due to the laser spot diameter, which in turn impairs attempts to increase the recording density.

SUMMARY OF THE INVENTION

The present invention was conceived in view of the aforementioned problems of the related art and provides an optical disc apparatus for recording data by emission power from an optical head on a recordable optical disc corresponding to a first optical disc standard, comprising a signal processor for applying signal processing to input data to generate recording data in accordance to a disc format which conforms to a second optical disc standard having a higher format efficiency than that of the first optical disc standard, wherein the recording data generated by the signal processor is recorded on a recordable optical disc corresponding to the first optical disc standard.

In accordance with one aspect of the present invention, there is provided an optical disc apparatus for recording data by emission power from an optical head on a recordable optical disc corresponding to a first optical disc standard, comprising a first signal processor for applying signal processing to input data to generate recording data in accordance with a disc format which conforms to the first optical disc standard; a second signal processor for applying signal processing to input data to generate recording data in accordance with a disc format which conforms to a second optical disc standard having a higher format efficiency than that of the first optical disc standard; and a controller for selecting the first signal processor as a processor for applying signal processing to the input data, when a standard recording mode is indicated as a data recording mode with respect to a recordable optical disc corresponding to the first optical disc standard, and selecting the second signal processor as a processor for applying signal processing to the input data, when a high density recording mode is indicated as a data recording mode with respect to a recordable optical disc corresponding to the first optical disc standard, wherein the recording data obtained by the signal processing of one of the first signal processor and the second signal processor which is selected by the controller is recorded on a recordable optical disc corresponding to the first optical disc standard.

BRIEF DESCRIPTION OF THE DRAWINGS

These and other advantages of the invention will be explained in the description below, in connection with the accompanying drawings, in which.

DETAILED DESCRIPTION OF THE PREFERRED EMBODIMENT

Figure 1:
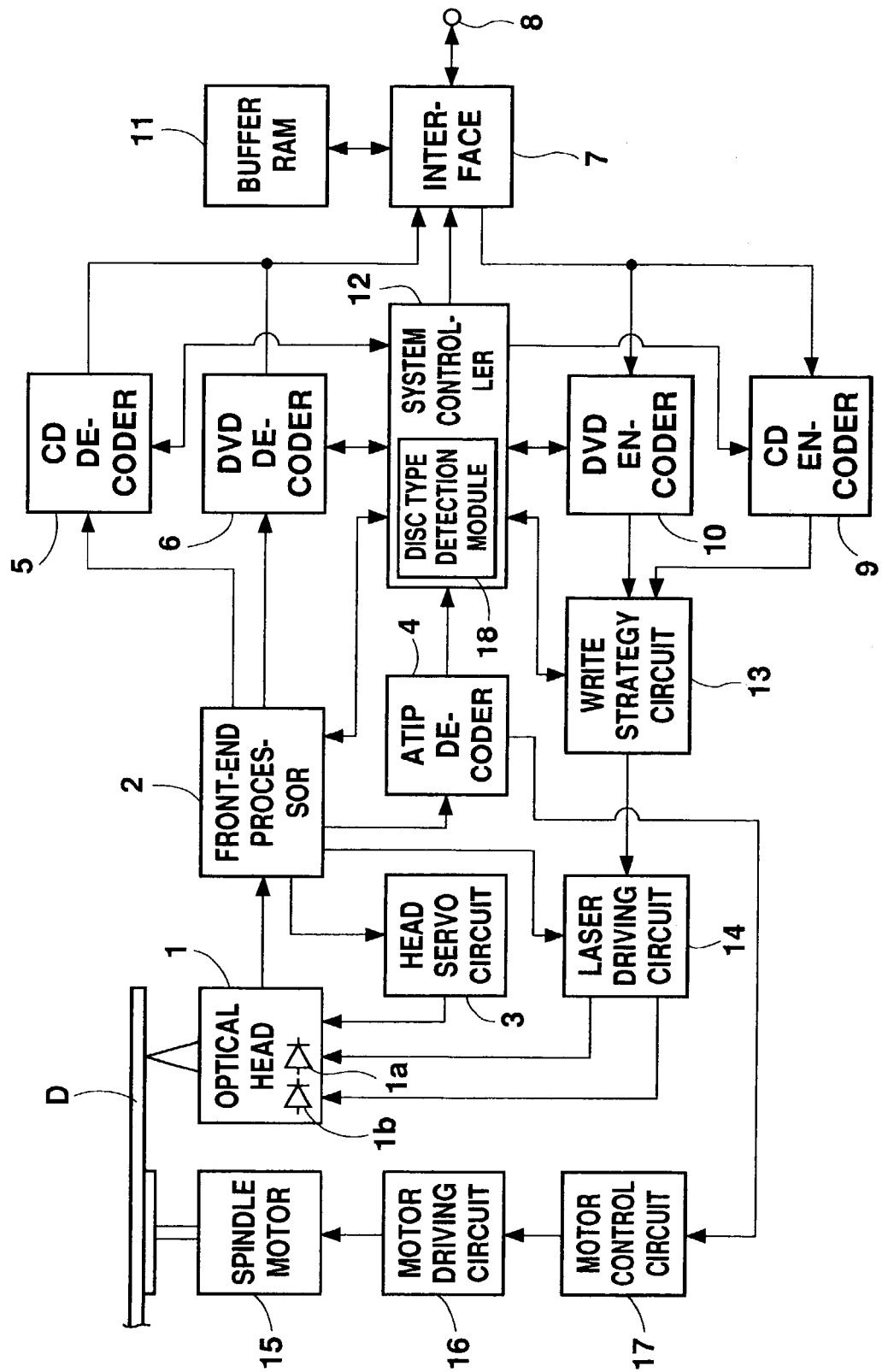
FIG. 1 is a circuit block diagram showing an embodiment of an optical disc apparatus according to the present invention.

FIG. 1 is a circuit block diagram showing an embodiment of an optical disc apparatus according to the present invention. The optical disc apparatus in FIG. 1 is an innovative CD-R/RW drive capable of recording and reproducing CDs and reproducing DVDs, and also capable of recording signal processing and reproducing signal processing corresponding to a data format which complies with the DVD standard.

Referring to FIG. 1, an optical head 1 emits laser beam for tracing a signal track of a disc D for writing and reading a data signal with regard to the disc. The optical head 1 includes, as light sources, a first laser diode 1a for emitting laser beam having a wavelength of 780 nm which is used for recording and reproduction of CDs and a second laser diode 1b for emitting laser beam having a wavelength of 650 nm which is used for reproduction of DVDs. The optical head 1 is configured such that the laser beam emitted from each laser diode 1a, 1b is applied to a CD disc or a DVD disc via an objective lens (not shown) having two focal points.

A front-end processor 2 generates an RF signal (a radio frequency signal) of a data signal read from the disc using various optical outputs generated by the optical head 1. The front-end processor 2 then controls gain of the RF signal to an optimum level and also equalizes the RF signal in accordance with each disc so as to provide binary data. Further, the front-end processor 2 generates a focus error signal indicative of a focus deviation of laser beam applied onto the disc from the optical head 1 with respect to the signal plane of the disc and a tracking error signal indicative of a tracking deviation of the laser beam with respect to the signal track on the disc.

A head servo circuit 3 performs focusing control for focusing the main beam on the signal side of the disc in accordance with the focus error signal, tracking control for controlling the main beam so as to track the signal track of the disc in accordance with the tracking error signal, and thread feeding control for moving the optical head 1 in the radial direction of the disc.

An ATIP decoder 4 demodulates ATIP (Absolute Time In Pre-Groove) address, which is a time information address, from a wobble signal extracted from the pre-groove of a CD type recording disc (CD-R, CD-RW) by the front-end processor 2.

A CD decoder 5 decodes the data from the disc which is supplied from the front-end processor 2 in accordance with a data format which is specified by the CD standard in synchronization with a bit clock. More specifically, the CD decoder 5 decodes the data based on EFM (Eight to Fourteen Modulation) and CIRC (Cross Interleaved Reed-Solomon Code), which are adopted as a modulation code and an error correction code, respectively, in the CD standard.

A DVD decoder 6, on the other hand, decodes the data from the disc which is supplied from the front-end processor 2 in accordance with a data format in the DVD standard in synchronization with a bit clock. More specifically, the DVD decoder 6 decodes data based on EFM-Plus and RS (Reed-Solomon) Product-Code, which are adopted as a modulation code and an error correction code, respectively, in the DVD standard.

An interface 7 controls data reception and transmission with respect to a master device such as a personal computer which is connected to the interface 7 via a connection terminal 8.

A CD encoder 9 encodes data which is input via the interface 7 based on the data format in the CD standard to generate CD data having a data structure which conforms to the data format.

A DVD encoder 10 encodes data which is input via the interface 7 based on the data format in the DVD standard to generate DVD data having a data structure which conforms to the data format.

The data input via the interface 7 is temporarily stored in a buffer RAM 11. The data in the buffer RAM 11 is used by the CD encoder 9 and the DVD encoder 10 when data encoding is performed and by the CD decoder 5 and the DVD decoder 6 when data decoding is performed. A system controller 12 controls the whole system concerning disc recording and reproduction.

A write strategy circuit 13 controls emission power of the optical head 1 such that optimum recording can be achieved with regard to the disc in consideration of recording characteristics of each of a CD-R disc and a CD-RW disc. A laser driving circuit 14 drives the first laser diode 1a and the second laser diode 1b in response to an APC (Automatic Power Control) circuit (not shown) included in the front-end processor 2 at the time of data reproduction of CD and DVD, and drives the first laser diode 1a of the optical head 1 in accordance with a pulse signal generated from the write strategy circuit 13 at the time of data recording.

The apparatus further comprises a spindle motor 15 for driving a disc for rotation, a motor driving circuit 16 for driving the spindle motor 15, and a motor controller 17 for controlling the motor driving circuit 16. The motor controller 17 is capable of controlling the rotation of the disc to maintain a constant linear velocity using a synchronization signal extracted from the data signal recorded on the disc and a bit clock, or in synchronization with an ATIP signal which is demodulated by the ATIP decoder 4, and also capable of controlling the rotation of the disc to maintain a constant angular velocity using a pulse signal which is generated in accordance with the rotation of the spindle motor 15.

The optical disc apparatus of FIG. 1, which is configured as described above, is capable of reproduction of CDs and DVDs, of data recording onto each of CD-R and CD-RW discs in a standard recording mode which conforms to the CD standard, and of recording onto CD-R and CD-RW discs in a high density recording mode corresponding to the DVD data format.

Figure 2:
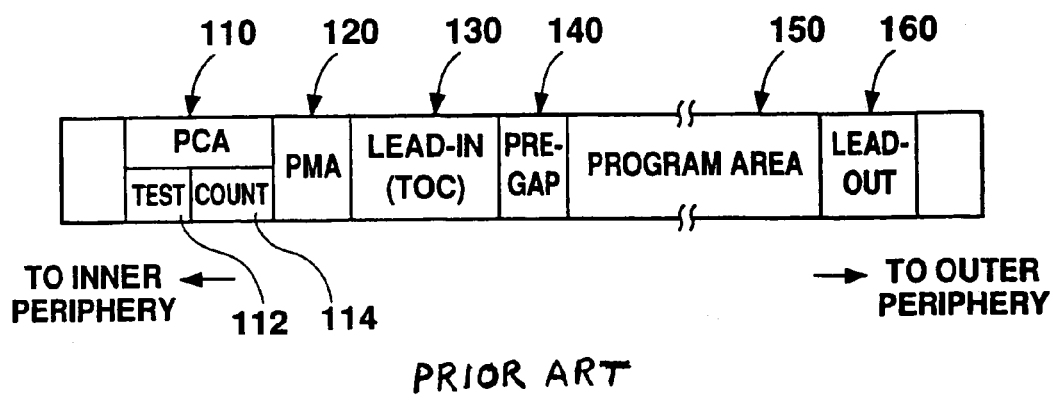
FIG. 2 is an explanatory view for explaining the of CD-R/RW disc formats.

The disc format of CD-R/RW will be described. As shown in FIG. 2, a CD-R/RW disc of typical disc format includes, from the inner to outer periphery, a PCA (Power Calibration Area) 110, a PMA (Program Management Area or Program Memory Area) 120, a lead-in area 130, a pre-gap area 140, a program area 150 and a lead-out area 160.

The PCA 110 further includes a test area 112 used for test recording and a counter area 114 counting the number of test recordings performed. The PMA 120 is an area which is used to temporarily store a temporary table of content of the disc until a session is closed. When a session is closed, the table of content information stored in the PMA 120 is recorded in the lead-in area 130 as proper TOC (Table Of Content). A mode for writing data on a CD-R or CD-RW disc according to the above format is referred to as a standard recording mode.

Figure 3:
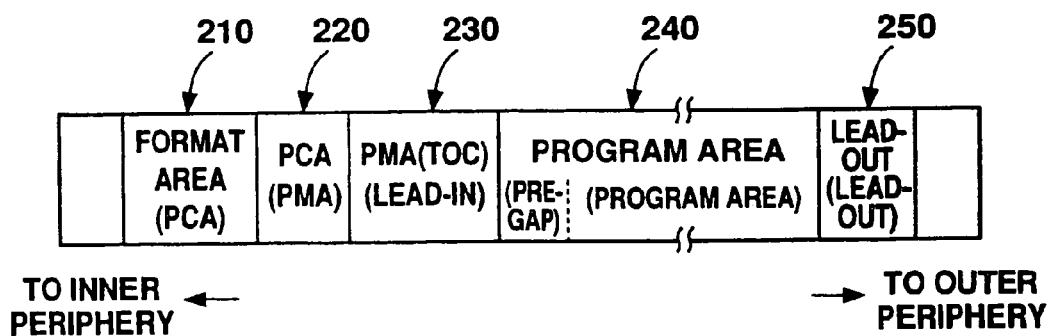
FIG. 3 is an explanatory view for explaining one example disc format of the high density recording mode.

For a high density recording mode, on the other hand, a special disc format which differs from the CD-R/RW disc format is employed. More specifically, as shown in FIG. 3, a disc corresponding to the high density recording mode includes, from the inner to outer periphery, a format area 210, a PCA 220, a PMA and TOC area 230, a program area 240, and a lead-out area 250. In FIG. 3, the area name of the typical format (see FIG. 2) corresponding to each area 210 to 250 is described in parentheses in the corresponding block.

In the format area 210, specific data irrelevant to the PCA is padded according to a format command exclusively used for the high density recording mode. The specific data to be padded may be data of all zeros, for example.

In the disc format for the high density recording mode (see FIG. 3), in contrast to the typical CD-R/RW disc format (see FIG. 2), the format area 210, the PCA 220, and the PMA (and the TOC area) 230 are formed at the locations corresponding to the PCA 110, the PMA 120, and the lead-in area 130, respectively. Further, the program area 240 starts from the start position of the pre-gap 140 and terminates immediately before the lead-out area 160.

In the disc format corresponding to the high density recording mode, because the area 230 corresponding to the lead-in area 130 on which the TOC is written in the typical CD-R/RW disc format is used as the PMA and TOC area, the area which is available for the TOC area is smaller than that in the CD-R/RW disc format. In the DVD data format, however, as there is no concept of sub-code channel which exists in the CD data format and the TOC data is recorded in the main channel, the capacity required for TOC data is smaller than that in the CD-R/RW disc format. It is therefore possible to secure a sufficient data capacity for recording the TOC data even when the space corresponding to the lead-in area 130 of the conventional format is used both for the PMA and the TOC, as shown in FIG. 3.

The PMA 230 of the data format shown in FIG. 3 can be used in a method as described below, for example. First, when writing a session on the disc, PMA data (PMD) which is temporary TOC information is written in the main channel of the PMA 230. Here, in the standard recording mode (See FIG. 2), when the session is closed, the data recorded in the PMA 120 is written in the lead-in area 130. In the high density recording mode, however, when the session is closed, the PMA data written in the PMA 230 is used per se, as data corresponding to the TOC data of the CD standard, rather than rewriting the PMA data recorded in the PMA 230 into another area. It is therefore required that a reading apparatus for reading data recorded on the disc in the high density recording mode be provided with a function which allows use of the data written in the PMA 230 as the TOC data.

The method of using the PMA 230 is not limited to the above example. For example, the PMA 230 may be divided into an area in which temporary TOC data (PMD) is recorded and an area in which the proper TOC data after session close is recorded. In this case, similar to the case of the conventional CD-R/RW, the data recorded in the area storing the temporary TOC data is rewritten in the area for recording the proper TOC data.

Figure 5:
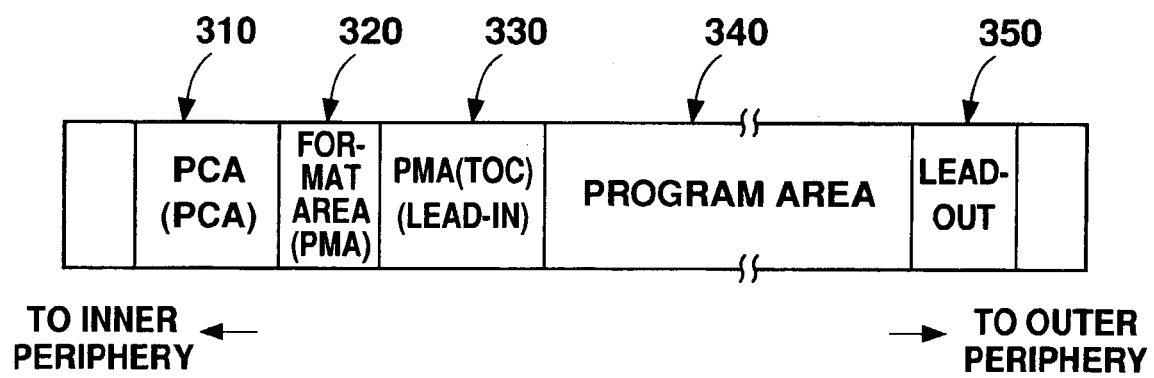
FIG. 5 is an explanatory view for explaining another example disc format of the high density recording mode.

Another example disc format corresponding to the high density recording mode is shown in FIG. 5. A disc of this format includes, from the inner to outer periphery, a PCA 310, a format area 320, a PMA (including a TOC area) 330, a program area 340, and a lead-out area 350. In this disc format, when compared with the typical CD-R/RW disc format (in the standard recording mode), the PCA 310, the format area 320, and the PCA (including TOC area) 330, are formed at the locations corresponding to the PCA 110, the PMA 120, and the lead-in area 130, respectively. In FIG. 5, the area name in the typical format (see FIG. 2) corresponding to each area 310 to 350 is described in parentheses in the corresponding block.

In this disc format for the high density recording mode, an area corresponding to the lead-in area 130 of the CD-R/RW disc format is used as the PMA 330 including the TOC area. The PMA data (PMD), which also serves as the TOC data of the CD format, is recorded in the main channel of the PMA 330, and is used as the data corresponding to the TOC data after session close. (In this case, the lead-in of the PMA data is formed in the leading edge of the session.)

Specific data irrelevant to the PMA is padded over the entire region of the format area 320 according to a format command exclusively used in the high density recording mode. The specific data may be all "zero" bits data, for example. Alternatively, the specific data may be device information data such as a manufacturer identification code, a model number, a serial number, a code indicative of a disc format in the high density recording mode.

Figure 4:
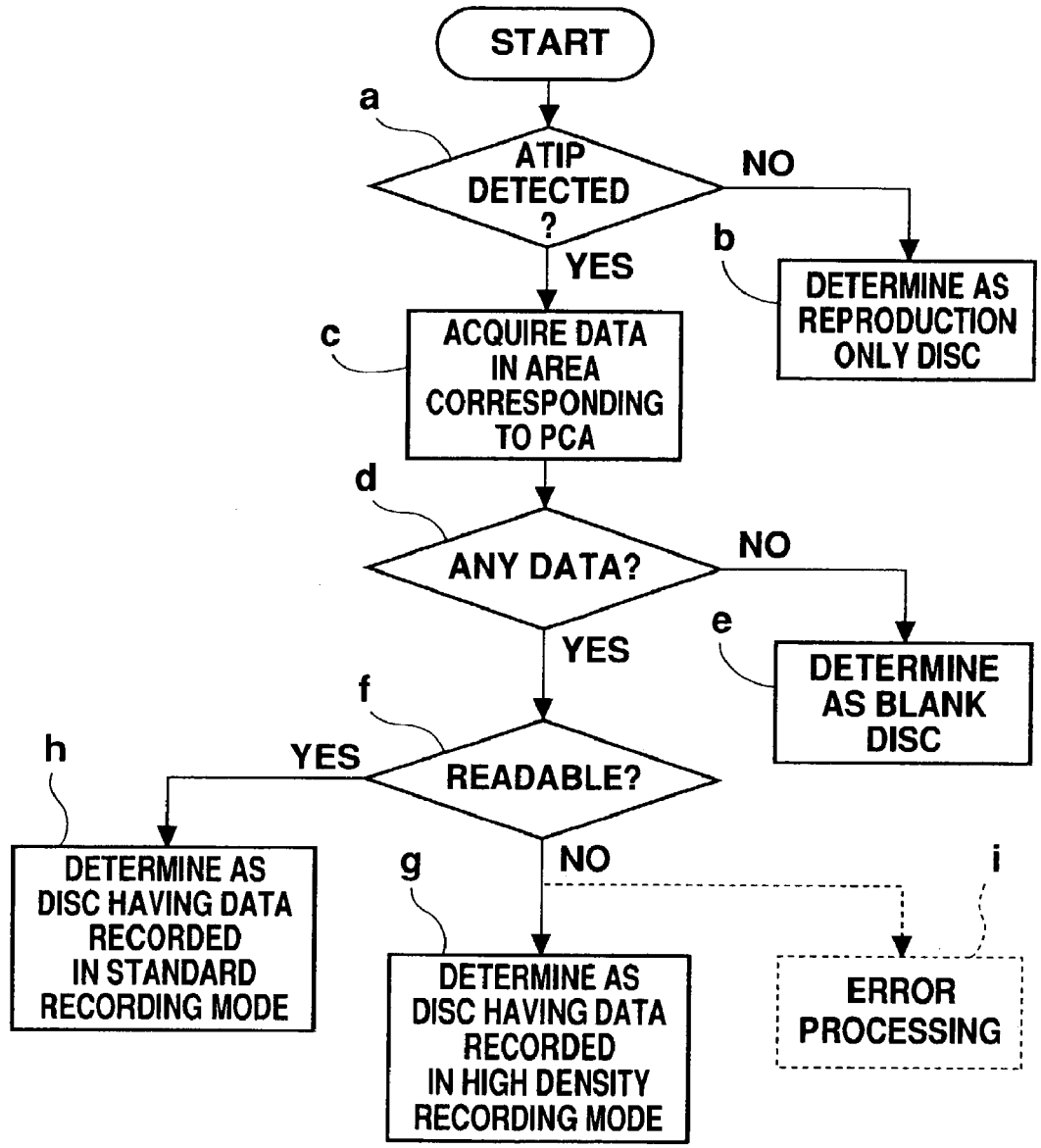
FIG. 4 is a flowchart showing a routine for determining a disc being used when the disc format of the high density recording mode shown in FIG. 3 is used.

An operation of the optical disc apparatus shown in FIG. 1 will be described with reference to FIG. 4 which shows a flowchart of a routine for detecting a disc type being used. The flowchart of FIG. 4 shows a disc type detection routine in an apparatus which uses, as a disc format in the high density recording mode, the format shown in FIG. 3.

When a disc is mounted, the first laser diode 1a of the optical head 1 is first driven into a reproduction state by the laser driving circuit 14 in accordance with the level of light reflected from the disc. Then, detection of an ATIP signal on the disc is performed. A disc type detection module 18 in the system controller 12 determines whether the disc is a recordable disc or a reproduction only disc based on the result of detection of ATIP signal (step a). Specifically, when an ATIP signal is not detected, the disc is judged as a reproduction only disc (step b). Note that when a disc is judged to be a reproduction only disc, it is then determined whether the disc is a CD or a DVD.

When an ATIP signal is detected at step a, on the other hand, the disc type detection module 18 judges the disc as a recordable disc, namely a CD-R or a CD-RW. Then, the disc type detection module 18 acquires data in a region on the disc corresponding to the PCA on the recordable CD disc format (step c).

The disc type detection module 18 then judges whether any data exists in the disc region corresponding to the PCA (step d). When no data exits in this area, the disc type detection module 18 determines that the disc is a blank disc on which no data has been recorded.

When it is determined at step d that data exists in the area corresponding to the PCA, the data is demodulated in accordance with the CD-R/RW standard to determine whether or not the data can be read as PCA data (step f).

At step f, when the data can be read, the data is relevant to the PCA, whereas when the data cannot be read, the data is irrelevant to the PCA.

More specifically, at step f, an attempt is made to obtain a count value indicative of the number of the test recording in the PCA. Whether or not the data can be read is determined as a result of this attempt.

When it is determined that the data acquired at step c is irrelevant to the PCA, it is determined that data recording in the high density recording mode has been performed on the disc (step g).

On the other hand, when the data acquired at step c is determined as recording calibration data in compliance with the CD-R/RW standard, it is determined that data recording in the standard recording mode has been performed on the disc (step h).

Figure 6:
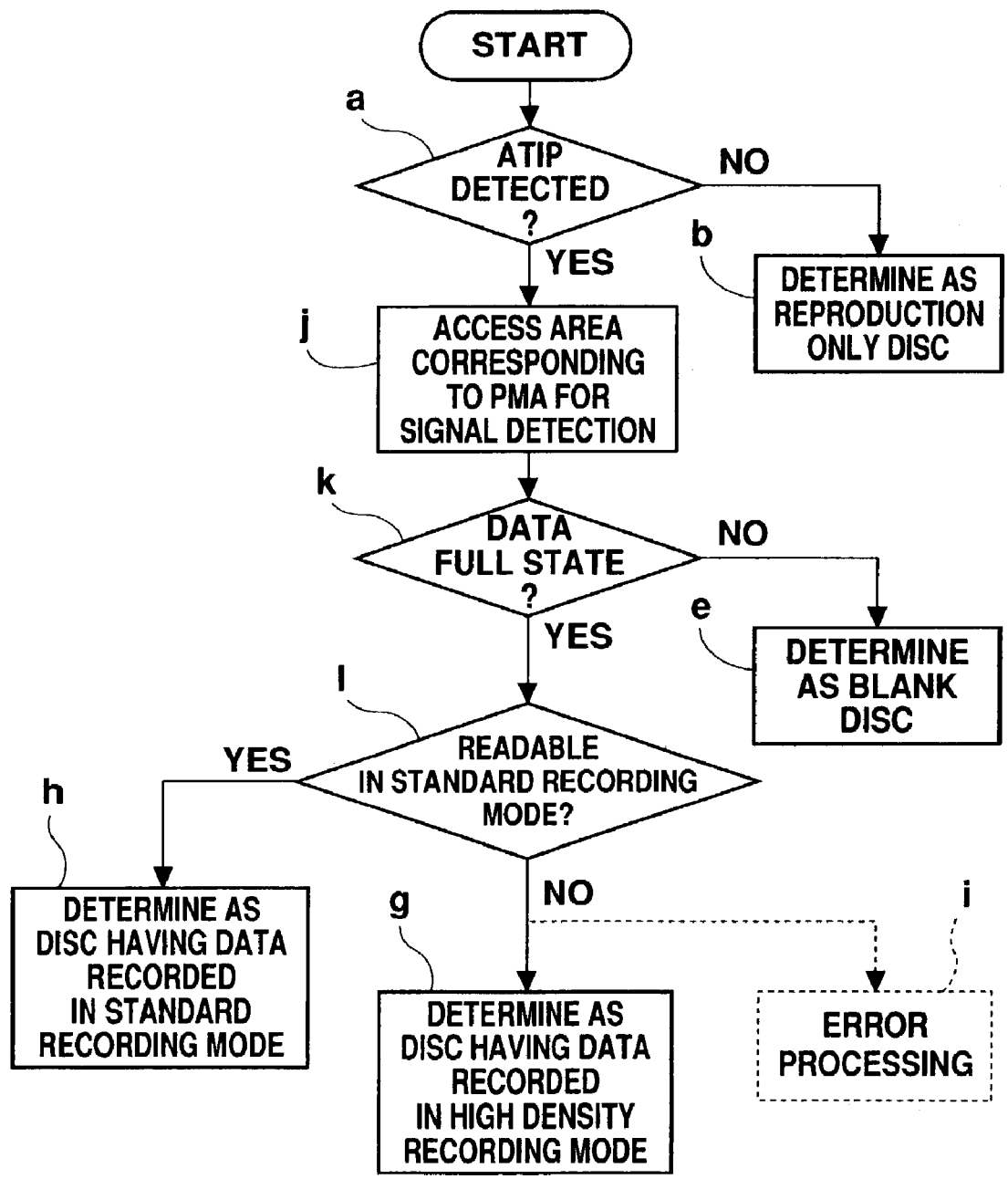
FIG. 6 is a flowchart showing a routine for determining a disc being used when the disc format of the high density recording mode shown in FIG. 5 is used.

When the disc format corresponding to the high density recording mode as shown in FIG. 5 is employed, the disc type detection process is as shown in the flowchart of FIG. 6. In FIG. 6, steps j, k, and l have replaced the steps c, d, and f, respectively, of the process in FIG. 4, and other steps are the same as the corresponding steps in FIG. 4.

At step j in FIG. 6, an area on the disc corresponding to the PMA in the standard recording mode is accessed to detect a signal in this area. At step k, it is determined whether or not this region is in a data full state in which a signal is recorded over the whole region of this area. When the data full state is not detected, the disc is determined to be a blank disc (step e).

When the data full state of the area is determined at step k, it is subsequently judged whether or not the data can be read in the standard recording mode (step l).

More specifically, at step l, the data in that area is demodulated in accordance with the PMA specification to determine whether or not the data is readable. When the data cannot be read (namely, it is determined that the data is irrelevant to the PMA), it is determined that data has been recorded on the disc according to the high density recording mode. On the other hand, when the data can be read (namely, it is determined that the data is relevant to the PMA), it is determined that data has been recorded on the disc according to the standard recording mode.

As a result of detection of the disc type, when the disc is judged to be either a disc on which data has been recorded in the high density recording mode or a blank disc, it is determined that recording in the high density recording mode can be performed with regard to the disc.

On the other hand, when the mounted disc is judged to be either a disc on which data has been recorded in the standard recording mode or a blank disc, it is determined that recording in the standard recording mode can be performed.

The judgment of allowable recording mode based on the disc type detection as described above is performed by the system controller 12. The allowable recording mode determined in this manner can be notified via the interface 7 to the master device connected with the connection terminal 8. The master device, when receiving such a notification, can indicate allowable recording modes to the user, who may then select a recording mode to be used, for example. The master device then issues a recording command indicating the recording mode selected by the user to the optical disc apparatus of the present embodiment.

Further, the system controller 12 inhibits issuance of a recording command regarding the standard recording mode to a disc which is determined by the disc type detection module 18 to be a disc on which data has been recorded in the high density recording mode, and inhibits issuance of a recording command regarding the high density recording mode to a disc which is determined by the disc type detection module 18 to be a disc on which data has been recorded in the standard recording mode. In other words, the system controller 12 prevents data from being recorded on a disc in a format which does not correspond to the format of data already recorded on the disc. For example, when the system controller 12 is instructed by the master device to record data in such a format that does not correspond to the format of data which has been recorded, the system controller 12 does not accept the instruction. In this case, the system controller may return an error message to the master device.

The recording operation of the optical disc apparatus when receiving a recording command from the master device will be described.

First, recording in the standard recording mode will be described.

When receiving a recording command requesting disc recording in the standard recording mode from the master device connected with the connection terminal 8, the system controller 12, in order to prepare for disc recording corresponding to the disc format of the recordable CD in response to the request, switches each circuit shown in FIG. 1 into a state for performing disc recording of the standard recording mode and selects a recording signal processing system which uses the CD encoder 9.

Further, in accordance with the request for the standard recording mode and a detected disc type, setting of the front-end processor 2, the head servo circuit 3, the write strategy circuit 13, and the laser driving circuit 14 is switched such that an operation suitable to the disc recording can be performed.

Also, in order to perform a recording operation at a recording rate requested by the recording command from the master device, the motor controller 17 controls the motor driving circuit 16 so that the disc is driven at a rotation rate corresponding to the recording rate set by the system controller 12.

The write strategy circuit 13 controls the laser driving circuit 14 so as to set the emission power of the first laser diode 1*a* of the optical head 1 to a prescribed recording level which complies with the set recording rate.

Prior to the start of disc recording, the PMA 120 of the disc is detected using the ATIP information and data is read from the PMA 120. It is then confirmed, from the data reading result, that a session has not been closed. Also, disc information data is acquired from the PMA data, and, based on the acquired disc information data, it is determined whether or not disc recording is possible and an address at which data recording can be performed.

Further, test recording is performed on the PCA 110 at the set recording rate while varying the emission power of the optical head 1 in steps, so that the emission power of the optical head 1 is set to an optimum recording level at which an error rate can be minimized when reproducing these test recording signals.

In a state wherein disc recording has been prepared as described above, a command for requesting recording and data to be recorded is transmitted from the master device and received via the interface 7, and the data is then written in the buffer RAM 11.

When the amount of data written in the buffer RAM 11 reaches a level which permits start of encoding process, the data is read from the buffer RAM 11 and encoded by the CD encoder 9 for generating CD data having a structure in accordance with the data format of the CD standard.

The CD data is then supplied to the write strategy circuit 13, which generates a recording pulse based on the CD data such that disc recording can be performed at the optimum recording level set by the test recording on the PCA, taking consideration of the recording characteristics of CD-R or CD-RW depending on the recordable disc of interest. Consequently, the first laser diode 1*a* of the optical head 1 is driven to form a recording mark based on the CD data on the disc in accordance with the recording pulse, thereby recording the data onto the disc.

Next, a recording operation in the high density recording mode for recording data corresponding to the DVD data format onto a CD-R disc or a CD-RW disc will be described.

In a case wherein it is determined that recording in the high density recording mode is possible, when receiving a recording command requesting disc recording in the high density recording mode from the master device connected with the connection terminal 8, the system controller 12, in order to prepare for disc recording corresponding to the disc format of the high density recording mode in response to the request, switches each circuit shown in FIG. 1 into a state for performing disc recording in the high density recording mode and selects a recording signal processing system which uses the DVD encoder 10.

Further, in accordance with the request for high density recording mode and a detected disc type, setting of the front-end processor 2, the head servo circuit 3, the write strategy circuit 13 and the laser driving circuit 14 is switched such that an operation suitable to the disc recording can be performed.

Also, in order to perform a recording operation at a requested recording rate, the motor controller 17 controls the motor driving circuit 16 so that the disc is driven at a rotation rate corresponding to the recording rate set by the system controller 12. The write strategy circuit 13 then controls the laser driving circuit 14 so as to set the emission power of the first laser diode 1a of the optical head 1 to a prescribed recording level which complies with the set recording rate.

Prior to the start of disc recording, the PMA data on the disc is detected using the ATIP information. As the PMA data is provided at a location corresponding to the lead-in area 130 of the disc format for the standard recording mode, in the disc format corresponding to the high density mode shown in both FIGS. 3 and 5, this location of the PMA. 120 is detected and the PMA data is read. As in the case of the standard recording mode, it is then confirmed, based on the data reading result, that a session has not been closed. Also, disc information data is acquired from the PMA data, and whether or not disc recording is possible and an address at which data recording can be performed is determined.

Further, test recording is performed on the PCA 220 on the disc at the set recording rate while the emission power of the optical head 1 is varied in steps corresponding to the disc format of the high density recording mode.

Here, in the disc format of the high density recording mode shown in FIG. 3, the PCA 220 is provided at a location corresponding to the PMA 120 in the disc format of the standard recording mode. The location of this PCA 220 is detected for test recording, and the emission power of the optical head 1 is set to an optimum recording level at which an error rate can be minimized when reproducing these test recording signals.

In the disc format of the high density recording mode shown in FIG. 5, on the other hand, the location of the PCA 310 corresponds to the PCA 110 in the disc format of the standard recording mode. Therefore, similar to the case of the standard recording mode, the location of this PCA 310 is detected for test recording, and the emission power of the optical head 1 is set to an optimum recording level at which an error rate can be minimized when reproducing these test recording signals.

In the high density recording mode, it is possible to increase the recording density per unit period using the method disclosed in Japanese Patent Application No. 2000-241544 (Japanese Patent Laid-Open Publication NO. 2002-056617) filed by the present applicant prior to the present application. More specifically, the recording density can be increased by recording data per predetermined unit based on actual recording address calculated based on the ATIP address and the factor of recording density. In this case, assuming that the recording density is n times (n>1) a standard density (namely, the factor is n), the actual recording address corresponds to n times the ATIP address A.

In a state wherein disc recording has been prepared as described above, a command for requesting recording and data to be recorded is transmitted from the master device and received via the interface 7, and the data is written in the buffer RAM 11.

Then, when the amount of data written in the buffer RAM 11 reaches a level which permits starting of the encoding process, the data is read from the buffer RAM 11 and encoded by the DVD encoder 10 for generating DVD data having a structure in accordance with the data format of the DVD standard.

The DVD data is then supplied to the write strategy circuit 13, which generates a recording pulse based on the DVD data such that disc recording can be performed at the optimum recording level set by the test recording on the PCA, taking consideration of the recording characteristics of CD-R or CD-RW depending on the recording disc of interest. Consequently, the first laser diode 1a of the optical head 1 is driven to form a recording mark based on the DVD data on the disc in accordance with the recording pulse, thereby recording the data onto the disc.

In the high density recording mode, data is recorded on the program area 240 or 340 in a file structure in compliance with the ISO 9660 logical format, a standard of CD-ROMs, in which the minimum sector unit is 2 k byte and the recording unit is 32 k byte. Therefore, when recording is to be completed with a data file of less than 32 k bite, one or more bits of zero is padded to such a file so as to record the file in recording units of 32 k bite.

It should be noted that redundancy of the data format is lower in the DVD standard than in the CD standard. Due to this difference in redundancy between these data formats, the format efficiency of the data format for the DVD standard is 1.49 times that of the CD standard.

Further, in the high density recording mode, because the actual recording address of the recording data to be recorded on the disc can be n times (n>1) the ATIP address, as described above, the linear recording density of recording data to be recorded on the disc can be increased without changing the track pitch.

In this case, while significant increase in the linear recording density cannot be expected due to use of laser beam having a wavelength of 780 nm which conforms to CDs, an advantage that an inexpensive optical head for CD recording can be used is still achievable. Assuming that the linear recording density is increased to be 1.35 times that of CDs, for example, recording in the high density recording mode can provide the recording density of 1.35×1.49=2.01 in combination with the above-described format efficiency, which is about two times that by the standard recording mode.

Disc reproduction will next be described.

When disc reproduction is requested by a reproduction command transmitted from the master device, the system controller 12 switches each circuit into a state for performing disc reproduction. At this time, the setting of the front-end processor 2, the head servo circuit 3, and the laser driving circuit 14 is switched so as to operate in compliance with the type of disc to be reproduced, and the laser diode (1a or 1b) used by the optical head 1 and the decoder to be used (5 or 6) are switched in accordance with the disc type.

When the mounted disc is judged to be a reproduction only CD or a recordable disc on which data has been recorded in the standard recording mode, the first laser diode 1a of the optical head 1 is set to the emission power level suitable for data reproduction corresponding to the disc type and is driven by the laser driving circuit 14. Then, data on the disc D is read by the optical head 1.

A signal read from the disc D is processed by the front-end processor 2 in a manner suitable to CDs to provide an RF signal. The front-end processor 2 then supplies CD data, which is binary data of the RF signal, to the CD decoder 5 and also supplies a focus error signal and a tracking error signal to the head servo circuit 3.

In the CD decoder 5, the CD data is demodulated by a decoding process corresponding to a data format of the CD standard.

The demodulated data is temporarily stored in the buffer RAM 11 when necessary, and is then supplied to the master device connected to the connection terminal 8 via the interface 7.

When the mounted disc is judged to be a DVD, on the other hand, the second laser diode 1b of the optical head 1 is set to the emission power level suitable for data reproduction corresponding to the disc type and is driven by the laser driving circuit 14. Then, data on the disc D is read by the optical head 1.

A signal read from the disc D is processed by the front-end processor 2 in a manner suitable to DVDs, to thereby provide an RF signal. The front-end processor 2 then supplies DVD data, which is binary data of the RF signal, to the DVD decoder 6 and also supplies a focus error signal and a tracking error signal which are also generated by a process suitable for DVDs to the head servo circuit 3.

In the DVD decoder 6, the DVD data is demodulated by a decoding process corresponding to a data format of the DVD standard.

The demodulated data is temporarily stored in the buffer RAM 11 when necessary, and is then supplied to the master device connected to the connection terminal 8 via the interface 7.

Further, when the mounted disc is judged to be a recordable disc on which data has been recorded in the high density recording mode, the first laser diode 1a of the optical head 1 is set to the emission power level suitable for data reproduction corresponding to the disc type and is driven by the laser driving circuit 14. Then, data on the disc D is read by the optical head 1 according to a process corresponding to the disc format of the high density recording mode.

A signal read from the disc D is processed by the front-end processor 2 in a manner suitable to DVDs to provide an RF signal. The front-end processor 2 then supplies DVD data, which is binary data of the RF signal, to the DVD decoder 6 and also supplies a focus error signal and a tracking error signal which are generated by a processing suitable for the recording CD to the head servo circuit 3.

In the DVD decoder 6, the DVD data is demodulated by a decoding process corresponding to a data format of the DVD standard.

The demodulated data is temporarily stored in the buffer RAM 11 when necessary, and is then supplied to the master device connected to the connection terminal 8 via the interface 7.

In CD-R/RW drives corresponding to the existing recordable CD standard, at the time of detection of disc type being used, when the ATIP signal is detected and data is acquired from the PCA, but when the acquired data cannot be read, the disc is judged to be an abnormal disc and error processing is performed as indicated by dotted line as step i in FIGS. 4 and 6.

Accordingly, existing CD-R/RW drives judge a CD-R disc or a CD-RW disc on which data has been recorded in the disc format for the high density recording mode to be an abnormal disc and perform an error processing.

However, in some existing CD-R/RW drives, the emission power of the first laser diode 1a of the optical head 1 can be set to a standard recording level which is previously set in the write strategy circuit 13 and continue a recording operation, even when data cannot be obtained from the PCA.

In order to correctly recognize a disc on which data has been recorded in the high density recording mode as an abnormal disc, the disc format of the high density recording mode as shown in FIG. 5 can be adopted in an existing drive.

Specifically, when data has been recorded on a disc in the disc format of the high density recording mode shown in FIG. 5, the PMA data cannot be read even by such an existing drive which can proceed to signal detection from PMA regardless of whether or not data can be obtained from the PCA. Therefore, such a disc is determined to be an abnormal disc and is subjected to error processing as shown in step i in FIG. 6.

As described above, CD-R and CD-RW discs on which data has been recorded in the high density recording mode in compliance to the DVD standard data format cannot be identified as a disc on which data has been normally recorded corresponding to the CD standard. Accordingly, among CD-R and CD-RW discs, a disc having data recorded in the high density recording mode and a disc having data normally recorded in the standard recording mode corresponding to the recording CD standard are discriminated prior to disc recording.

While the CD decoder 5, the DVD decoder 6, the CD encoder 9 and the DVD encoder 10 are shown as separate blocks in FIG. 1 for convenience of explanation, all these circuits 5, 6, 9, and 10 may be formed on a single LSI.

While the preferred embodiment of the present invention has been described using specific terms, such description is for illustrative purposes only, and it is to be understood that changes and variations may be made without departing from the spirit or scope of the appended claims.

What is claimed is:

1. An optical disc apparatus for recording data by emission power from an optical head on a recordable optical disc corresponding to a first optical disc standard, comprising;
a first signal processor for applying signal processing to input data to generate recording data in accordance with a disc format which conforms to the first optical disc standard;
a second signal processor for applying signal processing to input data to generate recording data in accordance with a disc format which conforms to a second optical disc standard having a higher format efficiency than that of the first optical disc standard; and
a controller for selecting the first signal processor as a processor for applying signal processing to the input data, when a standard recording mode is indicated as a data recording mode with respect to a recordable optical disc corresponding to the first optical disc standard, and selecting the second signal processor as a processor for applying signal processing to the input data, when a high density recording mode is indicated as a data recording mode with respect to a recordable optical disc corresponding to the first optical disc standard,
wherein the recording data obtained by the signal processing of one of the first signal processor and the second signal processor which is selected by the controller is recorded on a recordable optical disc corresponding to the first optical disc standard;
wherein the first optical disc standard specifies a disc format which includes a power calibration area for adjusting the emission power of the optical head to an optimum level for data recording; and wherein when data recording in the high density recording mode is performed, data irrelevant to data recorded on the power calibration area by data recording according to the first disc standard is recorded on an area of the recordable optical disc which corresponds to the power calibration area in the data format which conforms to the first optical disc standard.

2. An optical disc apparatus according to claim 1, wherein, when data recording in the high density recording mode is performed, a predetermined area other than the area which corresponds to the power calibration area in the data format which conforms to the first optical disc standard is used as the power calibration area.

3. An optical disc apparatus according to claim 1, further comprising a disc type detection module for determining the type of a recordable optical disc on which data is to be recorded, wherein the disc type detection module performs a reading operation regarding the area on the recordable optical disc which corresponds to the power calibration area in accordance with the first optical disc standard, and the disc type detection means determines the recordable optical disc to be a disc on which data which conforms to the data format of the first optical disc standard has been recorded, when, as a result of the reading operation, the data on the area corresponding to the power calibration area can be read as power calibration data which complies with the first optical disc standard, and determines the recordable optical disc to be a disc on which data which conforms to the data format of the second optical disc standard has been recorded, when the data on the area corresponding to the power calibration area cannot be read as power calibration data which complies with the first optical disc standard.

4. An optical disc apparatus according to claim 3, wherein the controller allows data recording in the standard recording mode to be performed on a recordable optical disc whet the recordable optical disc is determined by the disc type detection module as a disc on which data which conforms to the data format of the first optical disc standard has been recorded, and allows data recording in the high density recording mode to be performed on a recordable optical disc when the recordable optical disc is determined by the disc type detection module as a disc on which data which conforms to the data format of the second optical disc standard has been recorded.

5. An optical disc apparatus according to claim 4, wherein the controller informs a master device which instructs data recording to the optical disc apparatus, of which of the standard recording mode and the high density recording mode is allowed as a recording mode with regard to the optical disc.

6. An optical disc apparatus for recording data by emission power from an optical head on a recordable optical disc corresponding to a first optical disc standard, comprising;

a first signal processor for applying signal processing to input data to generate recording data in accordance with a disc format which conforms to the first optical disc standard;

a second signal processor for applying signal processing to input data to generate recording data in accordance with a disc format which conforms to a second optical disc standard having a higher format efficiency than that of the first optical disc standard; and a controller for selecting the first signal processor as a processor for applying signal processing to the input data, when a standard recording mode is indicated as a data recording mode with respect to a recordable optical disc corresponding to the first optical disc standard, and selecting the second signal processor as a processor for applying signal processing to the input data, when a high density recording mode is indicated as a data recording mode with respect to a recordable optical disc corresponding to the first optical disc standard, wherein the recording data obtained by the signal processing of one of the first signal processor and the second signal processor which is selected by the controller is recorded on a recordable optical disc corresponding to the first optical disc standard;

wherein the first optical disc standard specifies a data format which includes a program management area for temporarily storing a temporary table of contents of the recordable optical disc for a period until a session is closed; and wherein, when data recording in the high density recording mode is performed, data irrelevant to the temporary table of contents which conforms to the first optical disc standard is recorded on an area of the recordable optical disc which corresponds to the program management area in the data format which conforms to the first optical disc standard.

7. An optical disc apparatus according to claim 6 wherein, when data recording in the high density recording mode is performed, a predetermined area other than the area which corresponds to the program management area in the data format which conforms to the first optical disc standard is used as an area in which the temporary table of contents is written.

8. An optical disc apparatus according to claim 6, further comprising a disc type detection module for judging the type of a recordable optical disc on which data is to be recorded, wherein the disc type detection module performs a reading operation regarding the area on the recordable optical disc which corresponds to the program management area in accordance with the first optical disc standard, and the disc type detection means determines the recordable optical disc to be a disc on which data which conforms to the data format of the first optical disc standard has been recorded, when, as a result of the reading operation, the data on the area corresponding to the program management area can be read as the temporary table of contents which conforms to the first optical disc standard, and determines the recordable optical disc to be a disc on which data which conforms to the data format of a predetermined second optical disc standard which differs from the first optical disc standard has been recorded, when the data on the area corresponding to the program management area cannot be read as the temporary table of contents which conforms to the first optical disc standard.

9. An optical disc apparatus according to claim 8, wherein the controller allows data recording in the standard recording mode to be performed on a recordable optical disc when the recordable optical disc is determined by the disc type detection module to be a disc on which data which conforms to the data format of the first optical disc standard has been recorded, and allows data recording in the high density recording mode to be performed on a recordable optical disc when the recordable optical disc is determined by the disc type detection module to be a disc on which data which conforms to the data recorded format of the second optical disc standard has been recorded.

10. An optical disc apparatus according to claim 9, wherein the controller informs a master device which instructs data recording to the optical disc apparatus which one of the standard recording mode and the high density recording mode is allowed as a recording mode with regard to the optical disc.

* * * * *